United States Patent
Kassas et al.

(10) Patent No.: US 11,921,522 B2
(45) Date of Patent: Mar. 5, 2024

(54) SUB-METER ACCURATE NAVIGATION AND CYCLE SLIP DETECTION WITH LONG-TERM EVOLUTION (LTE) CARRIER PHASE MEASUREMENTS

(71) Applicant: The Regents of the University of California, Oakland, CA (US)

(72) Inventors: Zak Kassas, Irvine, CA (US); Kimia Shamaei, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 618 days.

(21) Appl. No.: 17/088,232

(22) Filed: Nov. 3, 2020

(65) Prior Publication Data

US 2021/0373180 A1 Dec. 2, 2021

Related U.S. Application Data

(60) Provisional application No. 62/930,298, filed on Nov. 4, 2019.

(51) Int. Cl.
| | |
|---|---|
| H04M 1/725 | (2021.01) |
| G01S 5/14 | (2006.01) |
| G05D 1/00 | (2006.01) |
| G06F 17/18 | (2006.01) |
| H04M 1/663 | (2006.01) |

(52) U.S. Cl.
CPC .............. G05D 1/101 (2013.01); G01S 5/145 (2013.01); G06F 17/18 (2013.01)

(58) Field of Classification Search
CPC ......... G06F 17/18; G05D 1/101; G01S 5/145; G01S 19/48; G01S 5/021; G01S 2205/03; G01S 5/0205; G01S 5/0226; G01S 5/0221; G01C 21/20
See application file for complete search history.

(56) References Cited

U.S. PATENT DOCUMENTS

| 5,019,824 A | * | 5/1991 | Kumar | ................. G01S 19/29 342/194 |
|---|---|---|---|---|
| 5,502,641 A | * | 3/1996 | Isomura | ................. G01C 15/00 701/470 |

(Continued)

*Primary Examiner* — Stephen M D Agosta
(74) *Attorney, Agent, or Firm* — John P. Teresinski, Esq.; Stites & Harbison, PLLC (57) ABSTRACT

This disclosure is directed to sub-meter level navigation accuracy for Unmanned Aerial Vehicles (UAVs) using broadband communication signals, such as cellular long-term evolution (LTE) signals. A framework and methods are provided using a receiver and controller to produce at least one of carrier phase, code phase, and Doppler frequency measurements from received LTE signals. Single difference measurements may be used to remove clock bias. LTE ENodeB clock biases are initialized using the known initial position of the UAV. The measurements are fused via an extended Kalman filter (EKF) to estimate the UAV position and integer ambiguities of the carrier phase single difference measurements. LTE signals can have different carrier frequencies and conventional algorithms do not estimate the integer ambiguities. Processes are described to detect cycle slip, where the carrier phase measurements from the LTE eNodeB multiple antenna ports are used to detect cycle slip.

18 Claims, 6 Drawing Sheets

(56) References Cited

U.S. PATENT DOCUMENTS

| | | | |
|---|---|---|---|
| 6,114,975 A * | 9/2000 | Guillard | G08G 5/025 342/357.31 |
| 6,449,558 B1 * | 9/2002 | Small | G01S 5/0289 342/357.44 |
| 6,469,663 B1 * | 10/2002 | Whitehead | G01S 19/46 342/357.44 |
| 7,248,211 B2 * | 7/2007 | Hatch | G01S 19/41 342/357.31 |
| 7,725,113 B2 * | 5/2010 | Fiedelak | G01S 19/074 455/456.6 |
| 10,330,792 B2 * | 6/2019 | Niesen | G01S 19/44 |
| 10,605,926 B2 * | 3/2020 | Lie | G01S 19/426 |
| 11,029,413 B1 * | 6/2021 | Rapoport | G01S 19/28 |
| 2002/0008661 A1 * | 1/2002 | McCall | G01S 19/47 701/472 |
| 2003/0218568 A1 * | 11/2003 | Kober | H04K 3/255 342/357.29 |
| 2004/0225438 A1 * | 11/2004 | Draganov | G01S 19/44 342/357.44 |
| 2005/0012660 A1 * | 1/2005 | Nielsen | G01S 19/07 342/357.31 |
| 2005/0065727 A1 * | 3/2005 | Hu | G01S 19/44 342/358 |
| 2006/0047413 A1 * | 3/2006 | Lopez | G01S 19/42 701/532 |
| 2006/0152409 A1 * | 7/2006 | Raman | G01S 19/24 342/357.48 |
| 2006/0232467 A1 * | 10/2006 | Small | G01S 5/0218 342/357.63 |
| 2007/0074179 A1 * | 3/2007 | Kwan | G06F 3/0312 717/136 |
| 2008/0036654 A1 * | 2/2008 | Hansen | G01S 19/51 342/357.53 |
| 2011/0141242 A1 * | 6/2011 | Fernandez Alvarez | G08G 1/0962 348/47 |
| 2011/0267227 A1 * | 11/2011 | Dai | G01S 19/54 342/357.27 |
| 2012/0076397 A1 * | 3/2012 | Moresve | G05D 1/0684 382/153 |
| 2012/0182180 A1 * | 7/2012 | Wolf | G01S 5/14 342/357.29 |
| 2013/0234885 A1 * | 9/2013 | Geier | G01S 19/44 342/357.23 |
| 2013/0271318 A1 * | 10/2013 | Doucet | G01S 19/44 342/357.64 |
| 2014/0002299 A1 * | 1/2014 | Leandro | G01S 19/11 342/357.27 |
| 2014/0062776 A1 * | 3/2014 | Ferguson | G01S 19/072 342/357.41 |
| 2016/0327653 A1 * | 11/2016 | Humphreys | G01S 19/54 |
| 2017/0031032 A1 * | 2/2017 | Garin | G01S 19/55 |
| 2017/0045622 A1 * | 2/2017 | Matsumoto | A61B 5/1118 |
| 2018/0074212 A1 * | 3/2018 | Niesen | G01S 19/393 |
| 2018/0098300 A1 * | 4/2018 | Venkatraman | H04W 72/044 |
| 2018/0188378 A1 * | 7/2018 | Rapoport | G01S 19/40 |
| 2018/0192233 A1 * | 7/2018 | Del Regno | G01S 19/071 |
| 2018/0330117 A1 * | 11/2018 | Hu | H04L 69/24 |
| 2019/0196022 A1 * | 6/2019 | Rezaei | G01S 19/426 |
| 2019/0223233 A1 * | 7/2019 | Hong | H04W 8/005 |
| 2019/0353800 A1 * | 11/2019 | Nirula | G01S 19/22 |
| 2021/0011174 A1 * | 1/2021 | Rapoport | G01S 19/33 |
| 2022/0003879 A1 * | 1/2022 | Zeitzew | G01S 19/51 |

* cited by examiner

SUB-METER ACCURATE NAVIGATION AND CYCLE SLIP DETECTION WITH LONG-TERM EVOLUTION (LTE) CARRIER PHASE MEASUREMENTS

CROSS REFERENCE TO RELATED APPLICATION

This application claims priority to U.S. Provisional Application No. 62/930,298 titled SUB-METER ACCURATE NAVIGATION AND CYCLE SLIP DETECTION WITH LONG-TERM EVOLUTION (LTE) CARRIER PHASE MEASUREMENTS filed on Nov. 4, 2019, the content of which is expressly incorporated by reference in its entirety.

STATEMENT OF GOVERNMENT SUPPORT

This invention was made with Government support under Grant No. N00014-16-1-2305 and Grant No. N00014-19-1-2511, awarded by the U.S. Office of Naval Research (ONR). The Government has certain rights in the invention.

FIELD

The present disclosure generally relates to determination of observables for navigation and control, and specifically to a framework for unmanned aerial vehicle (UAV) navigation using broadband communication signals, such as Long-Term Evolution (LTE) network signals, and methods to detect LTE carrier phase cycle slips.

BACKGROUND

Over the past few years, the demand for unmanned aerial vehicles (UAVs) has grown dramatically in several diverse applications, including agriculture, accident investigation, military, construction, mining, mapping, and surveying. Many of these applications demand an accurate and reliable navigation solution. Global navigation satellite systems (GNSS) are not able to serve as the anchor of navigation systems on-board future UAVs due to GNSS limitations. GNSS signals are highly attenuated in deep urban canyons (i.e. spaces between buildings) making them neither sufficiently reliable nor accurate for several UAV applications including package delivery, traffic control, and accident investigations. GNSS signals are highly susceptible to intentional interference (i.e. jamming) and counterfeit signals (i.e. spoofing), which can wreak havoc in military and civilian UAV applications.

There is a desire for use of cellular signals. Cellular signals are abundant, transmitted at a high power, and possess a suitable geometric diversity in deep urban canyons, which make them desirable for UAV applications in these environments. Further, cellular signals are transmitted at different frequency bands and from different cellular providers. Therefore, jamming or spoofing all cellular signals at once requires sophisticated hardware and high power, which is impractical.

There exists a desire and a need for use of cellular long-term evolution (LTE) signals to aide in navigation solutions.

BRIEF SUMMARY OF THE EMBODIMENTS

The disclosure is directed to systems and processes for navigation using cycle slip detection. In one embodiment, method includes receiving, by a device, a broadband communication signal, and processing, by the device, the broadband communication signal based on a navigation framework to determine at least one carrier phase measurement. The method also includes compensating, by the device, for at least one error of the at least one carrier phase measurement using at least one detected cycle slip. The method also includes determining, by the device, a position for the device based on the at least one carrier phase measurement and the at least one error. The method also includes outputting, by the device, a navigation observable based on the position determined for the device.

In one embodiment, the broadband communication signal is a cellular long term evolution (LTE) signal.

In one embodiment, the navigation framework includes an extended Kalman filter (EKF) state for navigation of an unmanned aerial vehicle (UAV).

In one embodiment, processing includes removing receiver clock bias from at least one of a carrier phase, code phase and frequency measurement data of the broadband communication signal.

In one embodiment, compensating for at least one error includes removing an effect of a receiver clock bias on the at least one carrier phase measurement relative to a reference transmitter within a plurality of transmitters by detecting the occurrence of cycle slips according to:

$$\phi_i^{(u)} = \frac{1}{\lambda^{(u)}} d_i^{(u)} + \frac{c}{\lambda^{(u)}}\left(\delta t_r - \delta t_s^{(u)}\right) + N_i^{(u)} + \varepsilon_{\phi_i}^{(u)}, \text{[cycle]}$$

for $i = 1, \ldots, A$, $$\phi_{12}^{(u)}(n) \triangleq \phi_1^{(u)}(n) - \phi_2^{(u)}(n) = \underbrace{N_1^{(u)}(n) - N_2^{(u)}(n)}_{\triangleq N_{12}^{(u)}(n)} + \varepsilon_{\phi_{12}}^{(u)}(n),$$

$$\Delta\phi_{12}^{(u)}(n) \triangleq \phi_{12}^{(u)}(n) - \phi_{12}^{(u)}(0) = N_{12}^{(u)}(n) - N_{12}^{(u)}(0) + \varepsilon_{\phi_{12}}^{(ul)}(n)0 - \varepsilon_{\phi_{12}}^{(ul)}(0).$$

wherein A is a number of antenna ports of the LTE SDR, and wherein cycle slips occur when $\Delta\phi_{12}^{(u)}(n)$ exceeds a threshold.

In one embodiment, a last known location of the device is used to initialize the navigation framework.

In one embodiment, determining position includes determining position and velocity using a carrier phase measurements for a plurality of antennas of the device.

In one embodiment, the navigation observable includes at least one pseudorange measurement between the device and a source of the broadband communication signal, wherein output of a navigation filter includes two-dimensional position and velocity of the device.

In one embodiment, the navigation observable is a sub-meter-level accurate navigation determination.

In one embodiment, the method also includes controlling navigation of an unmanned aerial vehicle (UAV) by the device using LTE signals based on LTE code phase measurement.

Another embodiment is directed to device configured for navigation using cycle slip detection. The device includes a receiver module configured to receive a broadband communication signal and a controller coupled to the receiver module. The controller is configured to receive a broadband communication signal, process the broadband communication signal based on a navigation framework to determine at least one carrier phase measurement, and compensate for at least one error of the at least one carrier phase measurement using detected cycle slips. The controller is also configured to determine a position for the device based on the at least one carrier phase measurement and the at least one error, and output a navigation observable based on the position determined for the device.

Other aspects, features, and techniques will be apparent to one skilled in the relevant art in view of the following detailed description of the embodiments.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein.

DETAILED DESCRIPTION OF THE EXEMPLARY EMBODIMENTS

Overview and Terminology

One aspect of the disclosure is directed to using broadband communication signals in a navigation framework for vehicles, such as unmanned aerial vehicles (UAV). According to one embodiment, a navigation framework is provided which uses an extended Kalman filter (EKF) to exploit a broad band communication signal. The navigation framework can determine at least one of a long term evolution (LTE) carrier and code phase and use Doppler frequency measurements to estimate device (e.g., UAV) position and velocity along with the integer ambiguities. Embodiments are also disclosed for a single difference method to remove the effect of a receiver clock bias. Embodiments may be based on an assumption that evolved node clock biases (ENodeB) are initialized and remain constant over the course of navigation. Embodiments are also directed to processes and operations to detect LTE carrier phase measurements cycle slips using ENodeB and multiple antenna carrier phase measurements.

Embodiments are directed to providing accuracy for UAV navigation and to ensure safe UAV operation. While carrier phase techniques in GNSS—namely, real-time kinematic (RTK) and precise point positioning (PPP)—can provide centimeter-level navigation solution accuracy, these techniques do not function well in GNSS-challenged environments. Embodiments are directed to use of broadband communication signals, such as cellular code-division multiple access (CDMA) signals, to yield sub-meter-level accurate UAV navigation using a dedicated carrier phase differential network. LTE has become the prominent standard for fourth-generation (4G) communication systems. The high transmission bandwidth of LTE signals has made them attractive for navigation applications. One or more operations and processes described herein may utilize software-defined receivers (SDRs) to extract pseudorange measurements from LTE signals.

One or more embodiments described herein address challenges in navigation with carrier phase measurements, including the unknown number of integer cycles between the transmitter and the receiver, namely integer ambiguity. In some situations, the carrier tracking loop maintains lock, and integer cycles remain constant. However, several factors including high receiver's dynamics, momentary loss of phase lock (e.g., due to signal blockage), and multipath can cause a discontinuity in the integer cycles, while the fractional part of the phase is measured continuously. This discontinuity in the integer cycles is called a cycle slip. Several approaches have been proposed for cycle slip detection in GNSS signals, including: (1) phase-code comparison, (2) phase-phase ionospheric residual, (3) Doppler integration, and (4) differential phases. Phase-code comparison can only be used for large cycle slip detection since the noise level of the code is high. The performance of phase-phase ionospheric residual depends on the ionospheric residuals and also requires multiple transmission frequencies (e.g., L1 and L2 in GPS). The receiver's high dynamics may be detected as cycle slip in Doppler integration and differential phases. Among the aforementioned algorithms for cycle slip detection, the second is geometry-free and has the highest accuracy for small ionospheric residuals due to precise phase measurements. Since the ionosphere does not affect terrestrial cellular signals, this approach seems promising for cycle slip detection of cellular signals. However, it requires phase measurements from multiple carrier frequencies for each transmitter, which is not usually available in cellular systems.

Cellular LTE signals are typically transmitted on one carrier frequency from each LTE base station (also known as evolved NodeB or eNodeB). Therefore, multiple carrier phase measurements from different carrier frequencies are not available for cellular LTE signals. However, carrier phase measurements can be obtained from multiple transmission antennas, which are installed on each eNodeB.

Embodiments are directed to device configurations, such as configurations for a receiver and/or UAV device for use of a broad band communication signal, such as a cellular long-term evolution (LTE) signal, to perform carrier phase measurements and achieve a sub-meter-level accurate UAV navigation solution while detecting cycle slips that may interfere with carrier phase measurements.

The disclosure provides experimental results demonstrating a two-dimensional (2-D) position root-mean-squared error (RMSE) of 81 cm for a UAV navigating with LTE signals while traversing a 605 m trajectory over 175 seconds.

The remainder of this disclosure is organized as follows. The "Navigation with LTE Carrier Phase Measurement Problem Formulation" section formulates the problem of navigating with LTE carrier phase measurements. The "Navigation Framework" section presents a proposed navigation framework and specifies the state and measurement models and time and measurement update steps according to one or more embodiments. The "Cycle Slip Detection"

section discusses the proposed cycle slip detection algorithm and processes according to one or more embodiments. The "Experimental Results" presents an embodiment of an experimental setup featuring the proposed framework and algorithm and the experimental results thereof.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

Exemplary Embodiments

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Navigation with LTE Carrier Phase Measurement Problem Formulation

Embodiments are directed to systems, methods and device configurations for navigation using a broadband communication signals, including unmanned aerial vehicle (UAV) navigation. These embodiments may utilize a navigation framework including operations performed by a device and one or more processes.

Figure 1A:
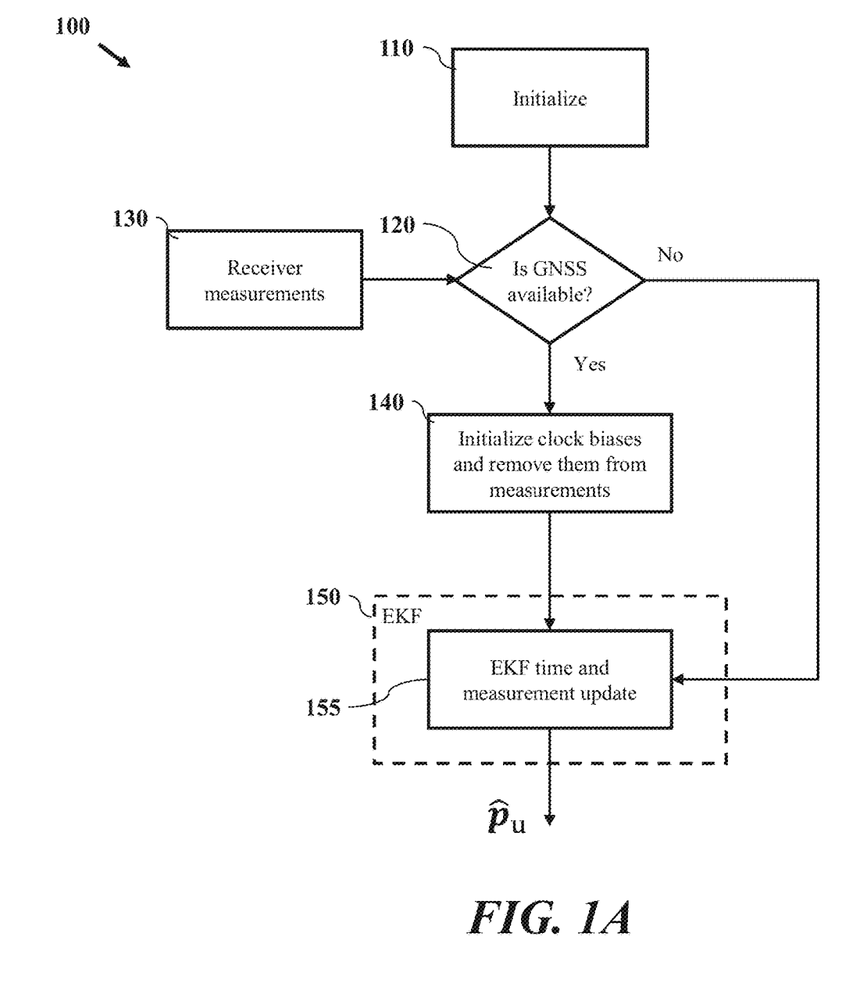
FIG. 1A is a block diagram of an exemplary embodiment of a navigation framework to obtain a sub-meter level accurate navigation solution using LTE signals according to one or more embodiments.

FIG. 1A illustrates a block diagram of an exemplary embodiment of a navigation framework 100 including operations to obtain a sub-meter level accurate navigation solution using LTE signals according to one or more embodiments. Framework 100 includes operations that may be performed as a process for cellular long-term evolution (LTE) signals. Framework 100 includes receiving, by a control unit of a device, LTE signals and removing receiver clock bias from at least one of carrier phase, code phase and frequency measurement data for the UAV. Framework 100 can also include initializing, by the control unit, an extended Kalman filter (EKF) state for navigation of the UAV using received LTE signals. Framework 100 may also include controlling, by the control unit, navigation of the UAV using LTE signals based on LTE code phase measurement, LTE carrier phase measurement and frequency. Framework 100 provides a solution for navigation using broadband communication signals. References to LTE signals are one example, it should be appreciated that the principles of the disclosure may be applied to other broadband communication signals.

Figure 2:
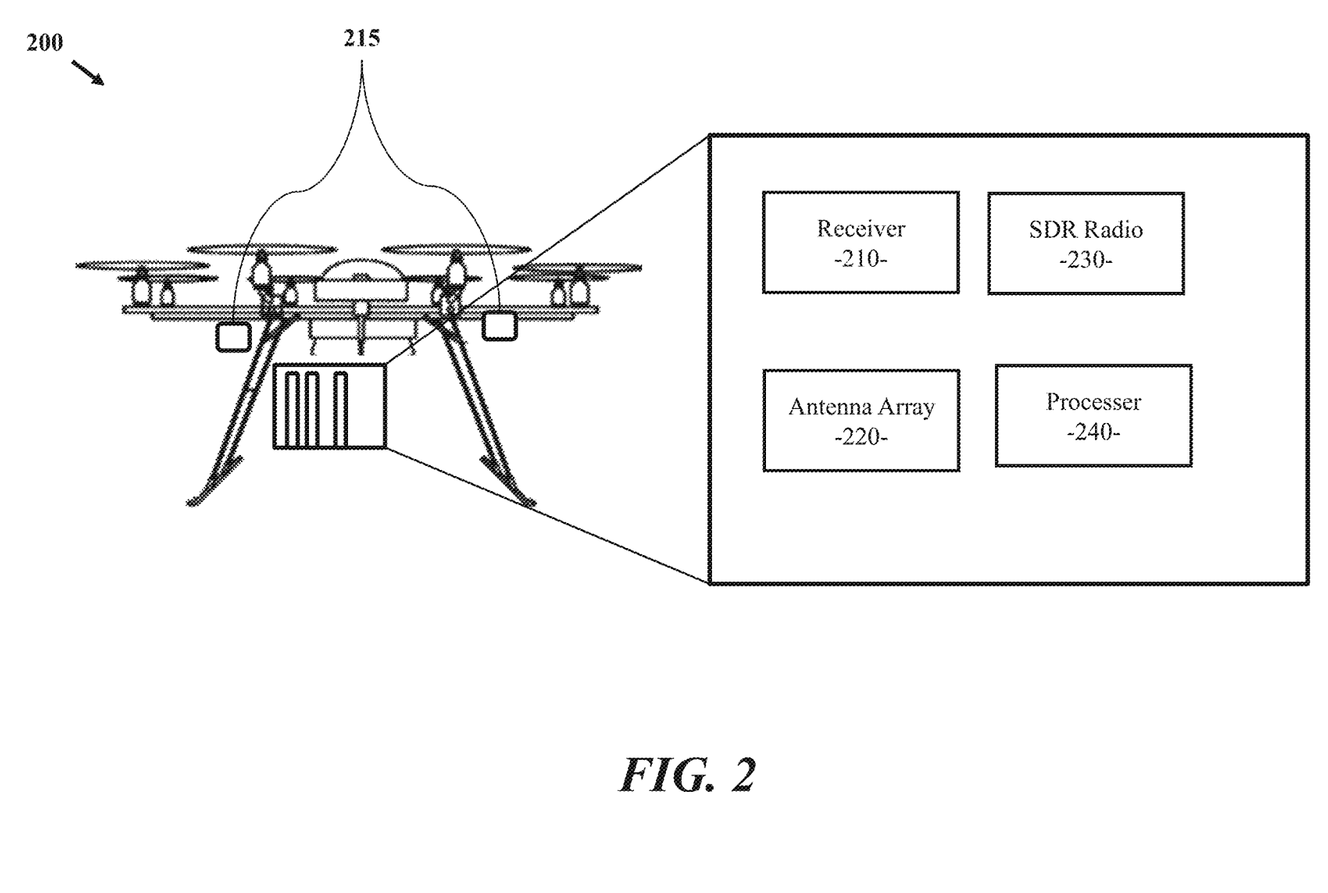
FIG. 2 illustrates unmanned aerial vehicle (UAV) configurations according to one or more embodiments.

The disclosure provides solutions to the problem of UAV navigation using LTE signals and highlights the challenges to achieve sub-meter level accuracy. For this purpose, an embodiment of a UAV in an environment including multiple LTE ENodeB is considered. In one embodiment, the UAV is equipped with an LTE software defined radio (SDR), which can produce carrier and code phase and Doppler frequency measurements. FIG. 2 describes a device configuration including a UAV. In one embodiment, the LTE code phase measurement to the u-th eNodeB can be modeled as $$\rho^{(u)} = d^{(u)} + c(\delta t_r - \delta t_s^{(u)}) + \varepsilon_\rho^{(u)}, [m] \quad (1)$$

for $u = 1, \ldots, U$, where U is the total number of ENodeB from which the receiver can extract measurements; $d^{(u)} \triangleq \|r_r - r_s^{(u)}\|_2$; $r_r = [x_r, y_r, z_r]^T$ and $r_s^{(u)} = [x_s^{(u)}, y_r^{(u)}, z_r^{(u)}]^T$ are the UAV and the u-th eNodeB locations, respectively; c is the speed of light; $\delta t_r$ and $\delta t_s^{(u)}$ are the UAV and the u-th ENodeB clock biases, respectively; and $\varepsilon_\rho^{(u)}$ is the code phase measurement noise, which is modeled as a zero-mean Gaussian random variable with a standard deviation of $\sigma_\rho^{(u)}$.

In one embodiment, the LTE carrier phase measurement to the u-th eNodeB can be similarly modeled as $$\phi^{(u)} = d^{(u)} + c(\delta t_r - \delta t_s^{(u)}) + \lambda^{(u)} N^{(u)} + \varepsilon_\phi^{(u)}, [m] \quad (2)$$

for $u = 1, \ldots U$, where $$\lambda^{(u)} = \frac{c}{f_c^{(u)}}$$

is the signal's wavelength; $f_c^{(u)}$ is the u-th ENodeB carrier frequency; $N^{(u)}$ is the integer ambiguity representing the number of cycles from the u-th eNodeB to the UAV; and $\varepsilon_\phi^{(u)}$ is the carrier phase measurement noise, which is modeled as a zero-mean Gaussian random variable with a standard deviation of $\sigma_\phi^{(u)}$.

In one embodiment, the LTE Doppler frequency measurement to the u-th eNodeB can be modeled as $$f_D^{(u)} = \frac{1}{\lambda^{(u)}} \frac{\dot{r}_r^T (r_r - p_s^{(u)})}{d^{(u)}} + c(\dot{\delta t}_r - \dot{\delta t}_s^{(u)}) + \varepsilon_f^{(u)}, [Hz] \quad (3)$$

for $u = 1, \ldots, U$, where $\dot{r}_r = [\dot{x}_r, \dot{y}_r, \dot{z}_r]$ is the speed of UAV; $\dot{\delta t}_r$ and $\dot{\delta t}_s^{(u)}$ are the UAV and the u-th ENodeB clock drifts, respectively; and $\varepsilon_f^{(u)}$ is the Doppler frequency measurement noise, which is modeled as a zero-mean Gaussian random variable with a standard deviation of $\sigma_f^{(u)}$.

It can be seen from (1), (2), and (3) that the UAV and the ENodeB' clock biases, which are unknown to the UAV, affect all the measurements of the embodiments under consideration. The effect of the UAV clock bias and drift, which is common in all the measurements, can be removed in one embodiment by subtracting the l-th ENodeB measurement from other ENodeB' measurements, which results in single difference measurements defined as $$\rho^{(ul)} \triangleq \rho^{(u)} - \rho^{(l)} = d^{(ul)} - c\delta t_s^{(ul)} + \varepsilon_\rho^{(ul)}, \quad (4)$$

$$\phi^{(ul)} \triangleq \phi^{(u)} - \phi^{(l)} = d^{(ul)} - c\delta t_s^{(ul)} + \lambda^{(u)} N^{(u)} - \lambda^{(l)} N^{(l)} + \varepsilon_\phi^{(ul)}, \quad (5)$$

$$f_D^{(ul)} \triangleq \quad (6)$$

$$f_D^{(u)} - f_D^{(l)} = -\frac{1}{\lambda^{(u)}} \frac{\dot{r}_r^T(r_r - r_s^{(u)})}{d^{(u)}} + -\frac{1}{\lambda^{(l)}} \frac{\dot{r}_r^T(r_r - r_s^{(l)})}{d^{(l)}} c\dot{\delta t}_s^{(ul)} + \varepsilon_f^{(ul)},$$

where $(\cdot)^{(ul)} \triangleq (\cdot)^{(u)} 31 (\cdot)^{(l)}$. The l-th eNodeB will be called the reference eNodeB.

One approach to remove the effect of the ENodeB clock biases is to use a base-rover framework. In this framework, the navigation observables of a receiver with known location, which is called base receiver, is transmitted to the receiver with unknown location, which is called a rover receiver. By subtracting the single difference measurements of the rover and base receiver, the common error terms (e.g., transmitter clock biases) can be removed, resulting in highly accurate measurements. Note that for this approach, the base receiver must be installed close to the rover receiver to be able to listen to the same transmitters and to experience similar errors (e.g., ionospheric error in GNSS measurements). A base-rover framework in GNSS systems requires a maximum distance of 10 to 20 km between the base and rover receivers. This distance ensures similarity between the base and rover common error sources, while listening to the same satellites. Therefore, GNSS systems require a relatively sparse base installation. However, this is not the case for navigation with cellular LTE signals. In one embodiment, to reduce the interference of each ENodeB signal with the neighboring ENodeB, the signal coverage of each ENodeB is designed to be typically less than 4 km. Therefore, the base and rover distance must be less than 4 km in a base-rover framework for navigation with LTE signals. This could necessitate a relatively dense network of base stations, which could be impractical. This disclosure presents an embodiment of a method of navigation wherein the high stability of LTE ENodeB clocks is used to eliminate the need for a base receiver.

Based on the LTE protocol, LTE ENodeB are required to have sufficiently stable clocks. Hence, in one embodiment, it can be assumed that $\dot{\delta t}_s^{(ul)}$ is zero over the UAV navigation course, resulting in the following model for the single difference Doppler frequency measurement $$f_D^{\prime(ul)} \triangleq -\frac{1}{\lambda^{(u)}} \frac{\dot{r}_r^T(p_r - p_s^{(u)})}{d^{(u)}} + -\frac{1}{\lambda^{(l)}} \frac{\dot{r}_r^T(p_r - p_s^{(l)})}{d^{(l)}} + \varepsilon_f^{(ul)}. \quad (7)$$

In one embodiment, UAV is assumed to have initial access to the GPS signals before starting to navigate with LTE signals. Therefore, in one embodiment, the known initial position of the UAV can be used to estimate $\delta t_s^{(uL)}$. The estimated value of $\delta t_s^{(ul)}$ is assumed to be constant during the UAV navigation course. In one embodiment, pseudorange and carrier phase measurements after removing the effect of ENodeB clock biases can be modeled as $$\rho^{\prime(ul)} \triangleq \rho^{(ul)} - c\hat{\delta t}_s^{(ul)} = d^{(ul)} + \varepsilon_\rho^{(ul)}, \quad (8)$$

$$\phi^{\prime(ul)} \triangleq \phi^{(ul)} - c\hat{\delta t}_s^{(ul)} = d^{(ul)} + \underbrace{\lambda^{(u)} N^{(u)} - \lambda^{(l)} N^{(l)}}_{\triangleq N_{float}^{(ul)}} + \varepsilon_\phi^{(ul)}. \quad (9)$$

By comparing (9) with GPS single difference carrier phase measurements, it can be seen that the effect of different ENodeB integer ambiguities cannot be modeled with one integer element. This is due to the fact that different LTE operators transmit at different carrier frequencies. Therefore, conventional algorithms to estimate integer ambiguities (e.g., Least-squares AMBiguity Decorrelation Adjustment (LAMBDA) algorithm) cannot be used here. In one embodiment, the value of $N_{float}^{(ul)}$, which is not necessarily an integer, is estimated along with other states of the filter.

Navigation Framework

EKF State Model

In one embodiment, the extended Kalman filter (EKF) state consists of the UAV position and velocity, and the vector of ambiguities N, given by $$x = [r_r^T, \dot{r}^T, N]^T, \quad (10)$$

where $\triangleq [N_{float}^{(21)}, \ldots, N_{float}^{(U1)}]^T$. In one embodiment, the state vector dynamics is modeled according to the following discretized model $$x(n+1) = Fx(n) + w(n), \quad (11)$$

where n is the discretized time sample; $F = \text{blkdiag}[F_{pv}, I_{U-1}]$; blkdiag denotes a matrix block diagonal; $I_m$ is the identity matrix of size m; w is a discrete-time zero-mean white noise with covariance matrix $Q = \text{blkdiag}[Q_{pv}, \in I_{U-1}]$; and $\in > 0$ is set to be very small, e.g., $10^{-10}$. In one embodiment, the UAV-mounted receiver dynamics are assumed to evolve according to a velocity random walk with the following dynamic model $$F_{pv} = \begin{bmatrix} I_3 & TI_3 \\ 0_{3\times 3} & I_3 \end{bmatrix}, \quad (12)$$

$$Q_{pv} = \begin{bmatrix} \tilde{q}_x \frac{T^3}{3} & 0 & 0 & \tilde{q}_x \frac{T^2}{2} & 0 & 0 \\ 0 & \tilde{q}_y \frac{T^3}{3} & 0 & 0 & \tilde{q}_y \frac{T^2}{2} & 0 \\ 0 & 0 & \tilde{q}_z \frac{T^3}{3} & 0 & 0 & \tilde{q}_z \frac{T^2}{2} \\ \tilde{q}_x \frac{T^2}{2} & 0 & 0 & \tilde{q}_x T & 0 & 0 \\ 0 & \tilde{q}_y \frac{T^2}{2} & 0 & 0 & \tilde{q}_y T & 0 \\ 0 & 0 & \tilde{q}_z \frac{T^2}{2} & 0 & 0 & \tilde{q}_z T \end{bmatrix}, \quad (13)$$

where T is the time interval between two measurements, and $\tilde{q}_x$, $\tilde{q}_y$, and $\tilde{q}_z$ are the power spectral densities of the acceleration in x, y, and z directions.

EKF Measurement Model

Due to the low vertical diversity of LTE ENodeB, the UAV altitude estimate suffers from large error. In one embodiment, an altimeter can be used to reduce the UAV altitude estimation uncertainty. In one embodiment, the measurement vector is defined as $z \triangleq [\rho^T, \phi^T, f^T, a]^T$ where $\rho = [\rho'^{(21)}, \ldots, \rho'^{(U1)}]^T$, $\phi = [\phi'^{(21)}, \ldots, \phi'^{(U1)}]^T$, $f = [f_D'^{(21)}, \ldots, f_D'^{(U1)}]^T$; $a \triangleq z_r \varepsilon_a$ is the altitude estimate derived from an altimeter; and $\varepsilon_a$ is the altitude measurement noise, which is modeled as a zero-mean Gaussian random variable with a standard deviation of $\sigma_a$.

In one embodiment, the measurement noise covariance matrix is defined as $R \triangleq \text{blkdiag}[R_\rho, R_\phi, R_f, \sigma_a^2]$, where $$R_\rho = \begin{bmatrix} \text{var}\{\varepsilon_\rho^{(21)}\} & \text{var}\{\varepsilon_\rho^{(1)}\} & \cdots & \text{var}\{\varepsilon_\rho^{(1)}\} \\ \text{var}\{\varepsilon_\rho^{(1)}\} & \text{var}\{\varepsilon_\rho^{(31)}\} & \ddots & \text{var}\{\varepsilon_\rho^{(1)}\} \\ \vdots & \ddots & \ddots & \vdots \\ \text{var}\{\varepsilon_\rho^{(1)}\} & \cdots & \text{var}\{\varepsilon_\rho^{(1)}\} & \text{var}\{\varepsilon_\rho^{(U1)}\} \end{bmatrix} \quad (14)$$

where var{·} represents the variance operator and var$\{\varepsilon_\rho^{(ul)}\} = \sigma_\rho^{(u)2} + \sigma_\rho^{(u)2}$. The values of $R_\phi$ and $R_f$ can be derived similar to (14).

EKF Time and Measurement Update

Denote $\hat{x}(n|j)$ to be the estimate of $x(n)$ given all the measurements up to time step $j < n$ and $P(n|j)$ to be its corresponding estimation error covariance matrix. In one embodiment, the EKF state estimate and its covariance time update equations are obtained as $$\hat{x}(n|n-1) = F\hat{x}(n-1|n-1), \quad (15)$$

$$P(n|n-1) = FP(n-1|n-1)F^T + Q. \quad (16)$$

In one embodiment, the EKF state and its covariance measurement update are performed according to $$\hat{x}(n|n) = \hat{x}(n|n-1) + K(n)v(n), \quad (17)$$

$$P(n|n) = [I - K(n)H(n)]P(n|n-1)[I - K(n)H(n)]^T + K(n)R(n)K^T(n), \quad (18)$$

where $H(n)$, $v(n)$, $S(n)$, and $K(n)$ are the measurement Jacobian matrix, innovation, innovation covariance matrix, and Kalman gain, respectively, given by $$v(n) = z(n) - \hat{z}(n \mid n-1),$$

$$S(n) = R(n) + H(n)P(n \mid n-1)H^T(n),$$

$$K(n) = P(n \mid n-1)H^T(n)S^{-1}(n),$$

$$H(n) = \begin{bmatrix} TG_1 & 0_{K-1\times3} & 0_{K-1\times K-1} \\ TG_1 & 0_{K-1\times3} & I_{K-1} \\ TG_2 & TG_3 & 0_{K-1\times K-1} \\ G_4 & 0_{1\times3} & 0_{1\times K-1} \end{bmatrix}, \quad (19)$$

$$G_1 = \begin{bmatrix} \frac{(\hat{p}_r - p_s^{(1)})^T}{\|\hat{p}_r - p_s^{(1)}\|_2} \\ \vdots \\ \frac{(\hat{p}_r - p_s^{(U)})^T}{\|\hat{p}_r - p_s^{(U)}\|_2} \end{bmatrix},$$

$$G_2 = \begin{bmatrix} \frac{1}{\lambda^{(1)}} \frac{\dot{r}_r^T(\hat{p}_r - p_s^{(1)})}{\|\hat{p}_r - p_s^{(1)}\|_2^3}(\hat{p}_r - p_s^{(1)})^T - \frac{1}{\lambda^{(1)}} \frac{\dot{r}_r^T}{\|\hat{p}_r - p_s^{(1)}\|_2} \\ \vdots \\ \frac{1}{\lambda^{(U)}} \frac{\dot{r}_r^T(\hat{p}_r - p_s^{(U)})}{\|\hat{p}_r - p_s^{(U)}\|_2^3}(\hat{p}_r - p_s^{(U)})^T - \frac{1}{\lambda^{(U)}} \frac{\dot{r}_r^T}{\|\hat{p}_r - p_s^{(U)}\|_2} \end{bmatrix},$$

$$G_3 = \begin{bmatrix} \frac{1}{\lambda^{(1)}} \frac{(\hat{p}_r - p_s^{(1)})^T}{\|\hat{p}_r - p_s^{(1)}\|_2} \\ \vdots \\ \frac{1}{\lambda^{(U)}} \frac{(\hat{p}_r - p_s^{(1)})^T}{\|\hat{p}_r - p_s^{(1)}\|_2} \end{bmatrix}, \quad G_4 = [0 \ 0 \ 1],$$

where $T = [-1_{U-1\times1}, I_{U-1}]$; and $-1_{j\times m}$ is a $j \times m$ matrix of all ones.

Navigation Framework

FIG. 1A illustrates navigation framework 100. In one embodiment, the navigation framework 100 initializes at block 110. Then, in one embodiment, the navigation framework 100 determines if GNSS signals are available at block 120. In one embodiment, the UAV 200 (see FIG. 2) can estimate its location while GNSS signals are available by means of receiver measurements collected at block 130. Receiver measurements at block 130 may provide GNSS measurements including a location estimate according to certain embodiments. The location estimates based on receiver measurements at block 130 can be used in one embodiment to estimate $\delta t_s^{(ul)}$ and remove it from the measurements at block 140. In one embodiment, if GNSS signals become unavailable, the last estimate of a device (e.g., UAV 200) location can be used to initialize the EKF state at block 110. In one embodiment, at least one of LTE code and carrier phase measurements and Doppler frequency can be used to navigate the device using time and measurement update at block 155 of an extended Kalman filter (EKF) 150.

Cycle Slip Detection

The LTE protocol described herein can operated based on at least one transmission antenna. By way of example, 1, 2, or 4 transmission antennas may be considered for the ENodeB (e.g, ENodeB 510 of FIG. 5) in order to increase data throughput. Although this disclosure primarily focuses on embodiments including 1, 2, or 4 transmission antennas, it should be understood that the disclosed methods may work with any number of transmission antennas.

According to one embodiment, a u-th eNodeB carrier phase measurement from antenna port i may be denoted as $$\phi_i^{(u)} = \frac{1}{\lambda^{(u)}} d_i^{(u)} + \frac{c}{\lambda^{(u)}}\left(\delta t_r - \delta t_s^{(u)}\right) + N_i^{(u)} + \varepsilon_{\phi_i}^{(u)}, \text{ [cycle]}$$

for $i = 1, \ldots, A$.

where A is a total number of antenna ports, here assumed to be 4.

In one embodiment, antenna ports 1 and 2 (and antenna ports 3 and 4 if available) only differ in the polarization and not the antennas positions. Therefore, in this embodiment, the received signals from antenna ports 1 and 2 have the same time-of-arrival (TOA) at the receiver, which means $d_1^{(u)} = d_2^{(u)}$. Define $\phi_{12}^{(u)}$ and $\Delta\phi_{12}^{(u)}$ at time-step n to be $$\phi_{12}^{(u)}(n) \triangleq \phi_1^{(u)}(n) - \phi_2^{(u)}(n) = \underbrace{N_1^{(u)}(n) - N_2^{(u)}(n)}_{\triangleq N_{12}^{(u)}(n)} + \varepsilon_{\phi_{12}}^{(u)}(n),$$

$$\Delta\phi_{12}^{(u)}(n) \triangleq \phi_{12}^{(u)}(n) - \phi_{12}^{(u)}(0) = N_{12}^{(u)}(n) - N_{12}^{(u)}(0) + \varepsilon_{\phi_{12}}^{(ul)}(n)0 - \varepsilon_{\phi_{12}}^{(ul)}(0).$$

When there is no cycle slip, $N_{12}^{(u)}(n)$ remains constant over time. However, the value of $N_{12}^{(u)}(n)$ changes over time when a cycle slip with different values happen on the carrier phase measurements from two different eNodeB (e.g., eNodeB 510) antenna ports. Therefore, in one embodiment, a threshold on $\Delta\phi_{12}^{(u)}(n)$ can be used to detect cycle slips. Note that the proposed algorithm can miss-detect the presence of cycle slips when they are similar on the carrier phase measurements of both antenna ports.

Figure 1B:
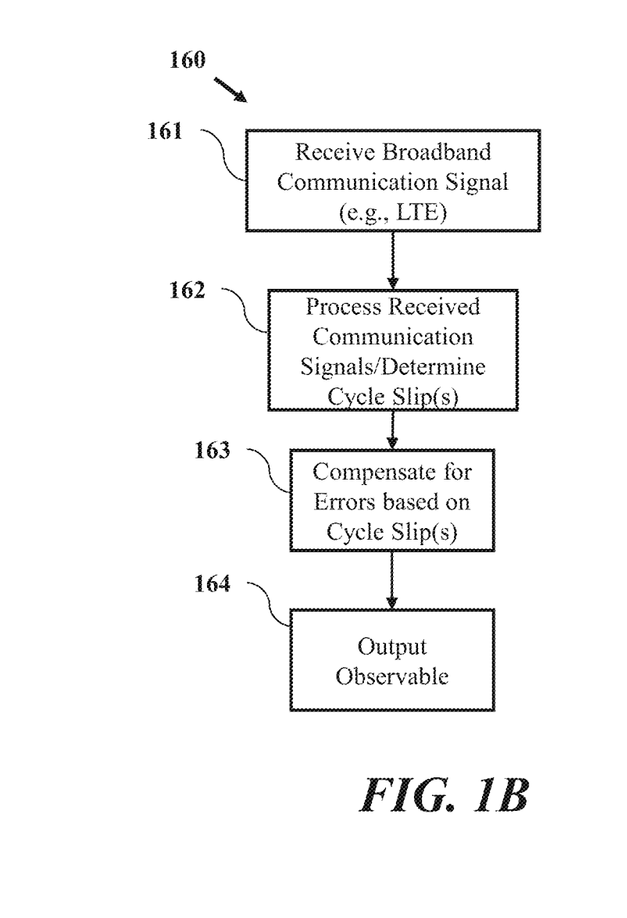
FIG. 1B illustrates a process for navigation using cycle slip detection according to one or more embodiments.

FIG. 1B illustrates a process for navigation using cycle slip detection according to one or more embodiments. According to one embodiment, process 160 may be performed by a device, such as device 170 of FIG. 1C and/or UAV 200. Process 160 may operate using one or more frameworks and devices described herein.

Process 160 may be initiated by a device receiving a broadband communication signal at block 161. The broadband communication signal may be a cellular long term evolution (LTE) signal. According to one embodiment, multiple broadband signal transmissions may be received at block 161 from multiple transmission sources located in a plurality of locations. Process 160 may be performed based on receiver broadband signals from one transmitter, from 2 transmitters, 4 transmitters, etc. The broadband communication signals received at block 161 may be received by an antenna array of a device.

At block 162, process 160 performs processing of the broadband communication signal based on a navigation framework to determine at least one carrier phase measurement. The navigation framework at block 162 includes an extended Kalman filter (EKF) state for navigation of an unmanned aerial vehicle (UAV). The extended Kalman filter operation is performed to estimate a state vector from carrier phase measurements. In one embodiment, processing includes removing receiver clock bias from at least one of a carrier phase, code phase and frequency measurement data of the broadband communication signal. According to one embodiment, cycle slips are determined using multiple antennas, such as output of an antenna array of the device. A last known location of the device may be used to initialize the navigation framework for determining cycle slip.

At block 163, process 160 includes compensating for at least one error of the at least one carrier phase measurement using at least one detected cycle slip. Compensating for at least one error includes removing an effect of a receiver clock bias on the at least one carrier phase measurement relative to a reference transmitter within a plurality of transmitters by detecting the occurrence of cycle slips. Cycle slips may be determined using a u-th eNodeB carrier phase measurement from antenna port i as described herein.

At block 164, process 160 includes outputting a navigation observable based on the position determined for the device. The navigation observable at block 164 may be a position estimation for the device based on the at least one carrier phase measurement and the cycle slip compensation. In one embodiment, the navigation observable includes at least one pseudorange measurement between the device and a source of the broadband communication signal. Output of a navigation framework can include a two-dimensional position and velocity of the device. The navigation observable may also be a sub-meter-level accurate navigation determination.

According to one embodiment, process 160 may be performed by a device such as a controller of a UAV. As such, process 160 may be performed in order to control navigation of an unmanned aerial vehicle (UAV) by the device using LTE signals based on at least one of an LTE carrier and code phase measurement.

Figure 1C:
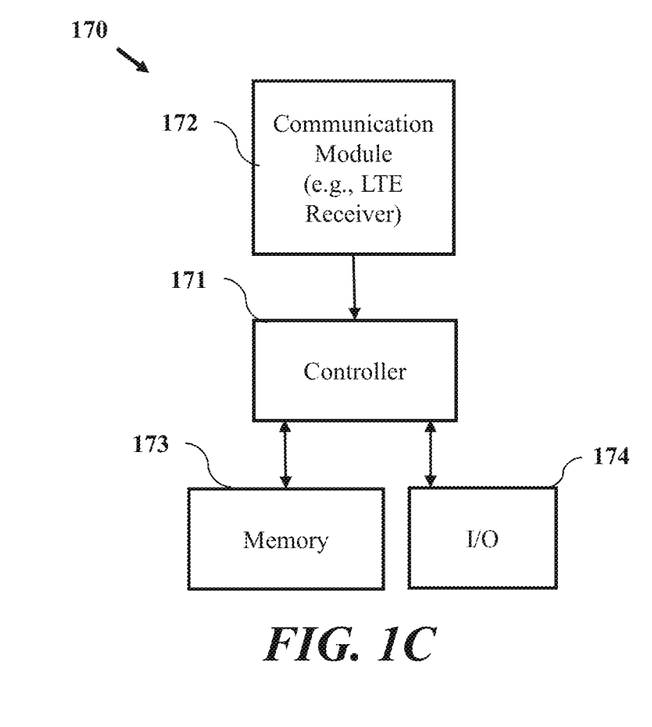
FIG. 1C is a device configuration according to one or more embodiments.

FIG. 1C is a device configuration according to one or more embodiments. FIG. 1C illustrates a device configuration for device, such as a UAV (UAV 200). According to one embodiment, device 4170 may include controller 171, communications module 172, memory 173, and input/output (I/O) unit 174.

Controller 171 may relate to a processor or control device configured to execute one or more operations stored in memory 173, such as a navigation framework including an EKF. Controller 171 may be coupled to memory 173, I/O 174 and communication module 172. Communications module 172 may be configured to receive one or more broadband communication signals from one or more antennas including LTE signals. According to one embodiment, communications module 172 may include a plurality of antennas configured as an antenna array. I/O 174 may be configured to receive one or more IMU measurements.

Communications module 172 may be configured to receive a broadband communication signal from an antenna of an LTE transmitter. Controller 171 may be configured to process the broadband communication signal based on a navigation framework and at least one antenna of a device to determine cycle slips and compensate for error based on cycle slip. Controller 171 may be configured to determine and output a navigation observable, such as a position or pseudo range measurement, for the device based on the carrier phase measurement and corrected cycle slip. Controller 171 may be configured to output a navigation observable including a position estimate determined for the device which can be utilized by a controller of a UAV.

Experimental Results

To evaluate the performance of the proposed method, an experiment utilizing an embodiment of the proposed method was performed in Mission Viejo, CA, USA. This section of the disclosure presents an embodiment of the experimental hardware and software setup, as well as the achieved navigation results on a UAV 200.

Hardware and Hardware Setup

FIG. 2 illustrates unmanned aerial vehicle (UAV) configurations according to one or more embodiments. According to one embodiment UAV device 200 is equipped with a receiver 210, antenna array 220, software defined radio (SDAR Radio) 23) and processor 240. UAV may employ a software-defined receiver (SDR) mounted to the UAV. UAV 200 is shown with an experimental hardware setup in FIG. 2. In one embodiment, a DJI Matrice 600 model UAV was utilized as UAV 200 and was equipped with a four-channel National Instrument (NI) universal software radio peripheral (USRP)-2955 230 to sample LTE signals at four different carrier frequencies by means of an LTE antenna array 220. For this experiment, the LTE carrier frequencies 1955, 2145, 2125, and 739 MHz were used, which are allocated to the U.S. cellular operators AT&T, T-Mobile, and Verizon. The sampling rate was set to 10 MSps and the sampled LTE signals were recorded on a processor 240 (e.g., laptop, etc.).

In one embodiment, a Septentrio AsteRx-i V 210, which was equipped with dual antenna multi-frequency GNSS receivers 215 with RTK and a Vectornav VN-100 micro electromechanical systems (MEMS) inertial measurement unit (IMU), was used to estimate the position and orientation of the UAV 200, which was used as the ground truth.

In one embodiment, the values of the power spectral densities of the acceleration in x, y, and z directions were set to $\tilde{q}_x=1$, $\tilde{q}_y=1$, and $\tilde{q}_z=0.1$ m$^2$/s$^3$, respectively. In one embodiment, a random variable with a standard deviation of 1 m was added to the true altitude of the UAV 200 over time and was used as an altimeter measurement. The true standard deviations of the measurements, which were obtained using the ground truth, were used to build the measurement covariance matrix R.

Over the course of the experiment, the receiver traversed a trajectory of 605 m over 175 seconds, while listening to 11 ENodeB 510. The locations of the ENodeB 510 in the environment were mapped before the experiment (see FIG. 5). The ENodeB 510 cell IDs and their corresponding carrier frequencies are presented in Table I, which includes a listing of exemplary eNodeB characteristics.

TABLE 1

ENODEBS' CHARACTERISTICS

| Cell ID | Carrier frequency (MHz) |
|---|---|
| 78 | 2145 |
| 104, 352 | 1955 |
| 308, 358, 224, 58, 354 | 2125 |
| 492, 5, 27 | 739 |

The sampled LTE signals were processed offline using the proposed LTE SDR in "LTE receiver design and multipath analysis for navigation in urban environments". The resulting measurements were used to estimate the location of the receiver using the proposed navigation framework 100.

Experimental Results

1) Measurements

Figure 3A:
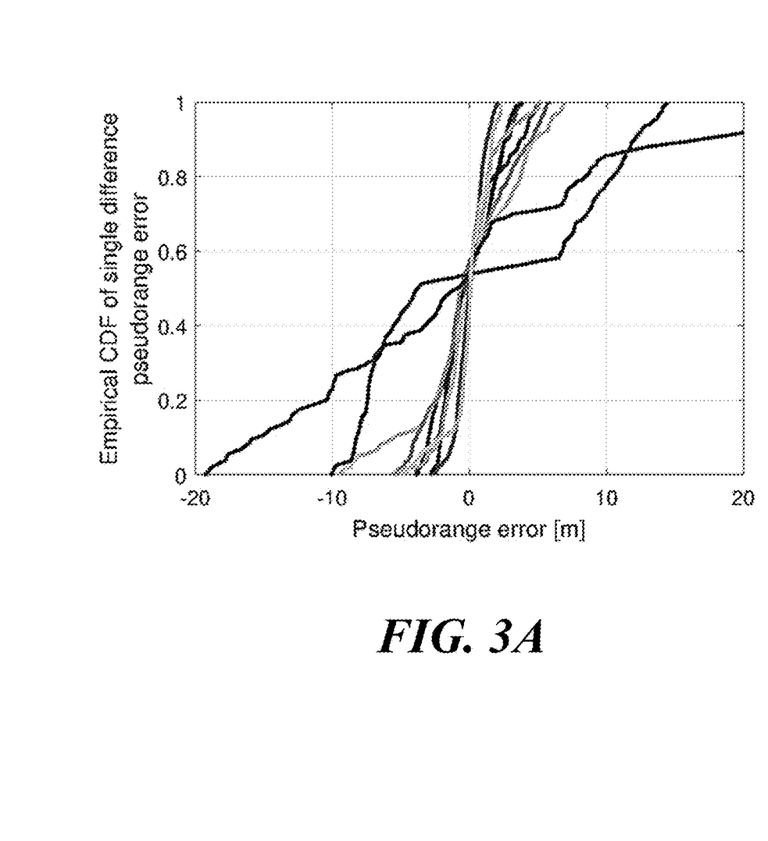
FIG. 3A is a graphic illustration of an exemplary embodiment of a cumulative distribution function (CDF) of pseudorange errors according to one or more embodiments.
Figure 3B:
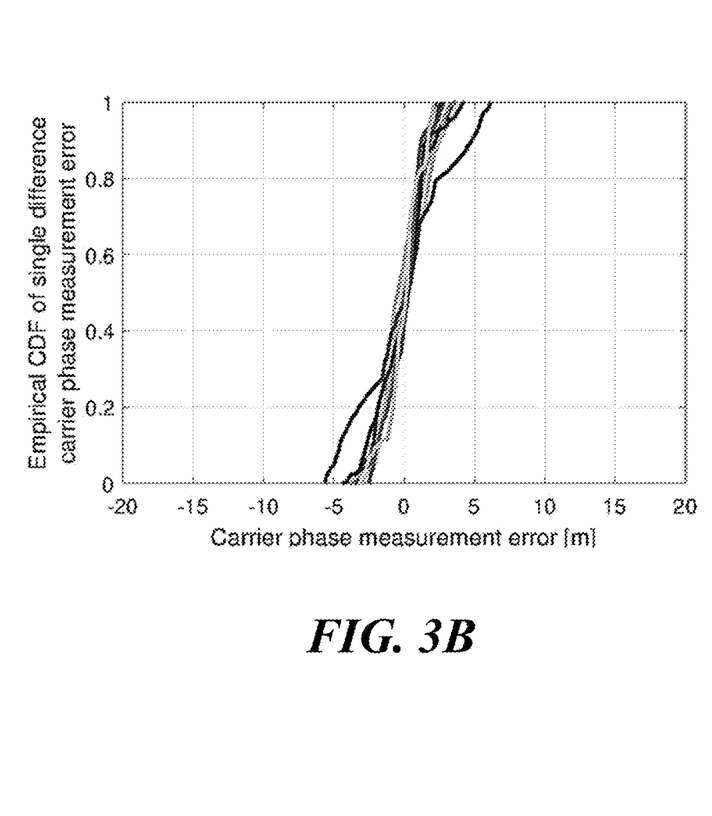
FIG. 3B is a graphic illustration of an exemplary embodiment of a CDF of carrier phase measurement errors according to one or more embodiments.
Figure 4A:
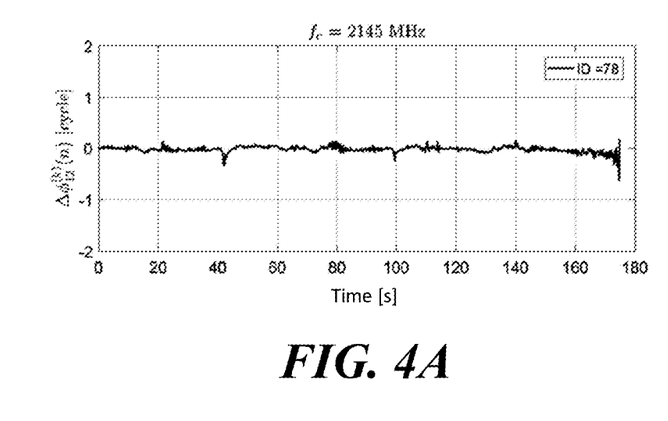
FIGS. 4A-4D are graphic illustrations of an exemplary embodiments of the values of $\Delta\phi_{12}^{(u)}(n)$ over time for a given frequency according to one or more embodiments.
Figure 4B:
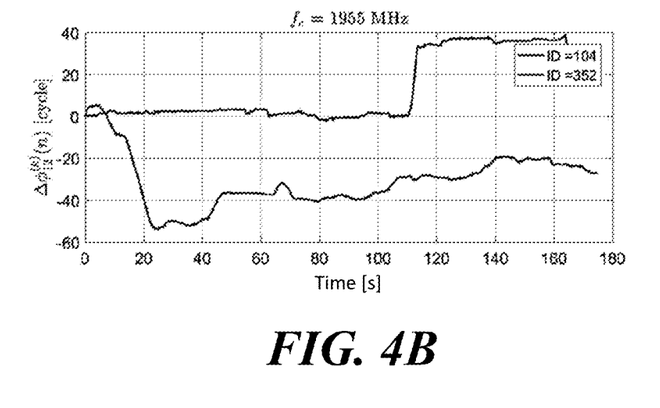
Figure 4C:
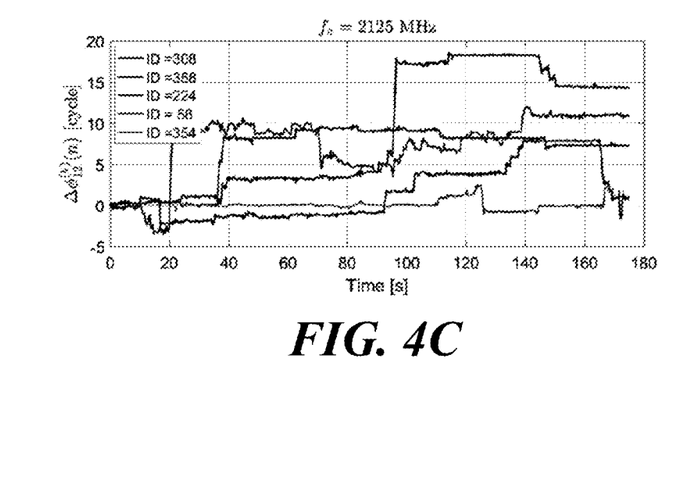
Figure 4D:
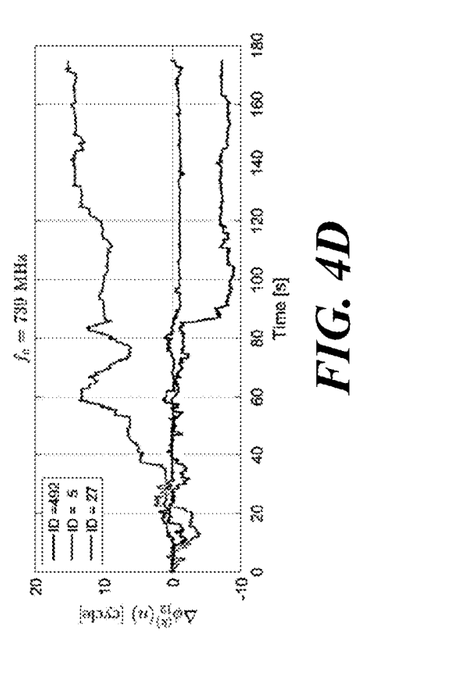

FIG. 3A is a graphic illustration of an exemplary embodiment of a cumulative distribution function (CDF) of pseudorange errors according to one or more embodiments. FIG. 3B is a graphic illustration of an exemplary embodiment of a CDF of carrier phase measurement errors according to one or more embodiments. FIGS. 3A and 3B present exemplary representations of cumulative distribution functions (CDFs) of the single difference pseudorange and carrier phase measurement errors, i.e., $\rho^{(ul)}-d^{(ul)}$ and $\phi^{(ul)}-d^{(ul)}$. Note that $d^{(ul)}$ was obtained using the ground truth. In one embodiment, to remove the effect of ENodeB clock biases and integer ambiguities from the plots, the means of $\rho^{(ul)}-d^{(ul)}$ and $\phi^{(ul)}-d^{(ul)}$ over time were subtracted from the results. FIGS. 3A and 3B show that the carrier phase measurements have higher precision compared to the pseudorange measurements.

2) Cycle Slip Detection

FIGS. 4A-4D are graphic illustrations of exemplary embodiments of the values of $\Delta\phi_{12}^{(ul)}$ (n) over time for a given frequency for all the cell IDs. It can be seen that only for an eNodeB 510 with cell ID 78, the value of $\Delta\phi_{12}^{(ul)}$ (n) stays less than one cycle during the course of the experiment. This means that, in one embodiment: (i) the carrier phase measurement from the cell ID 78 does not have any cycle slip or (ii) cycle slips on the carrier phase measurements from antenna ports 1 and 2 were equal. It can be concluded from FIGS. 4A-4D that all the carrier phase measurements except the one for cell ID 78 were affected by cycle slips. The cycle slips can be due to several factors including:

High receiver's dynamics: The traversed path included several turns, which can cause receiver's loss of phase lock.

Momentary signal loss: The UAV 200 altitude was relatively low compared to the surrounding buildings. Besides, the ENodeB 510 have low altitudes and as a result, the signal can be blocked momentarily, which can cause cycle slips.

Multipath: The buildings in the UAV 200 surrounding environment can cause significant multipath, which can result in a discontinuity in the integer cycles while the fractional part of the phase is measured continuously.

3) Navigation Solutions

Figure 5:
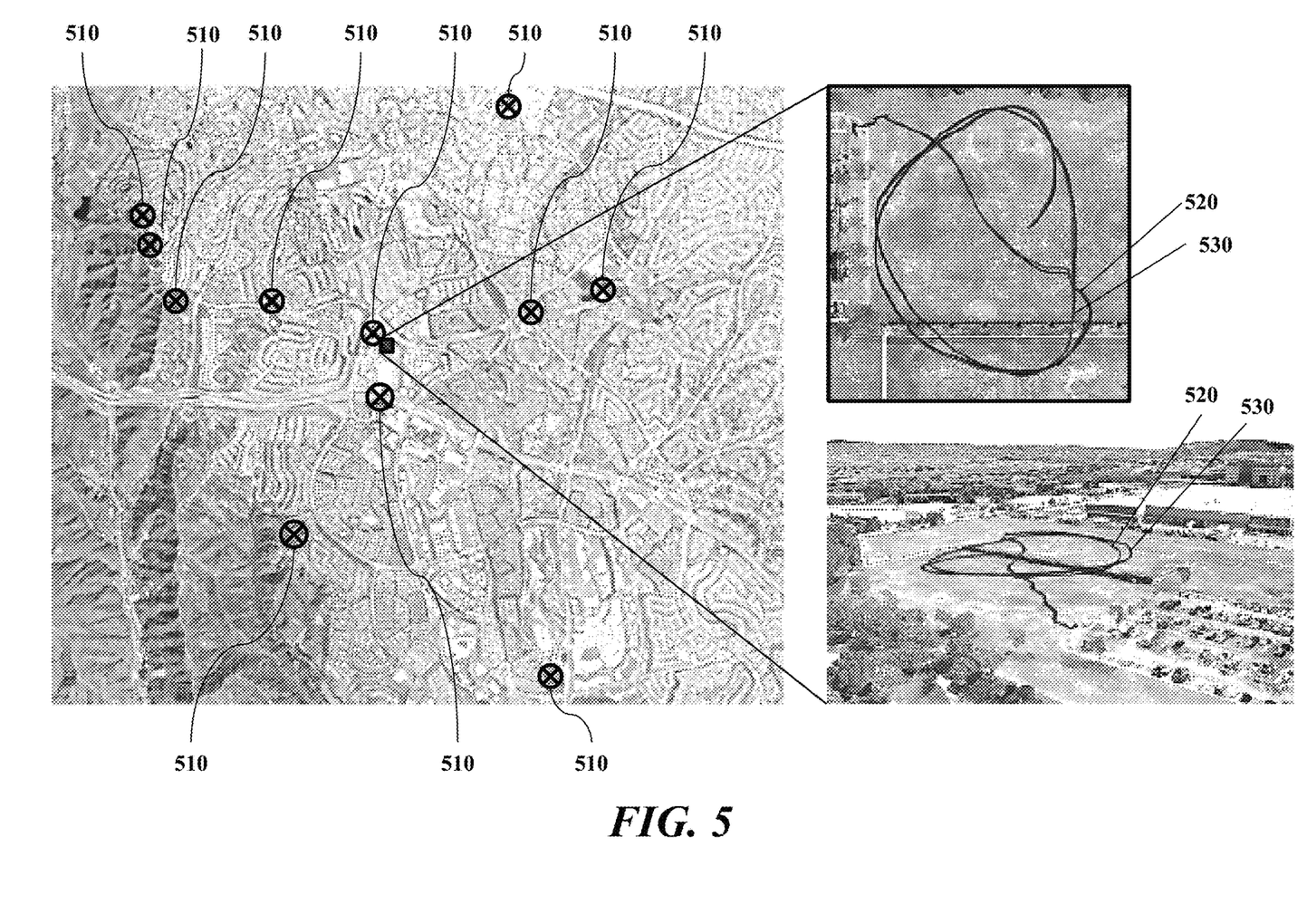
FIG. 5 is a graphical representation of a location to be navigated, wherein the location hosts a plurality of ENodeB for use by a navigation framework according to one or more embodiments.

FIG. 5 is a graphical representation of a location to be navigated, wherein the location hosts a plurality of ENodeB for use by a navigation framework according to one or more embodiments. FIG. 5 illustrates the environmental layout of the experiment, the location of the ENodeB 510, ground truth 520, and the LTE navigation solution 530 (largely overlapped with the ground truth 520). The result of one embodiment shows a 2-D RMSE of 81 cm over the course of the experiment. The results of an experiment of an exemplary embodiment of a navigation framework are summarized in Table II.

TABLE II

NAVIGATION SOLUTION RESULTS

| 2-D RMSE | 3-D RMSE | Maximum error |
|---|---|---|
| 0.81 [m] | 0.86 [m] | 2.49 [m] |

4) Discussion

In one embodiment, the difference between the LTE navigation solution and the ground truth is due to several sources of error, including:

Cycle slip: as shown in FIGS. 4A-4D, the carrier phase measurements experienced significant cycle slips over the course of the experiment, which reduces the precision of carrier phase measurements.

ENodeB clock biases: as discussed in the "Navigation with LTE Carrier Phase Measurement Problem Formulation" section, the ENodeB 510 clock biases were assumed to be constant over the course of the UAV 200 navigation. Small changes in the value of the ENodeB 510 clock biases can introduce error in all the measurements. In one embodiment, this can be resolved using a base receiver.

Multipath: The UAV 200 altitude was relatively low compared to the surrounding buildings and trees. Therefore, the received signal suffered from multipath effects. The multipath error can be reduced by flying at higher altitudes.

Uncertainty in ENodeB 510 locations: The locations of the ENodeB 510 were mapped using Google Earth, which is not very accurate. In one embodiment, using a location database can reduce the error due to this factor.

Different carrier frequencies: Since different operators use different carrier frequencies, the effect of the number of cycles on single difference carrier phase measurements $N_{float}^{(ul)}$ is not an integer and its estimate can introduce error in the solution. In one embodiment, this can be resolved using a base receiver.

Model mismatch: A velocity random walk was used to model the UAV 200 dynamics. The mismatch between this model and the UAV 200 true dynamics causes error in the position estimate. In one embodiment, this can be resolved by using an inertial measurement unit (IMU) to propagate the states.

Conclusion

This disclosure presented embodiments for UAV navigation method using cellular LTE signals. A navigation framework 100 is provided that uses LTE code and carrier phase and Doppler frequency measurements to estimate the UAV 200 location. A method to detect cycle slip is discussed that uses the difference of the carrier phase measurements made from different LTE eNodeB 510 antenna ports. Experimental results are provided to evaluate the performance of the proposed framework 100 and some sources of error and the methods to resolve errors are discussed. Experimental results are presented showing a UAV 200 traversing a trajectory of 605 m over 175 seconds, achieving a 2-D RMSE of 81 cm and a maximum error of 2.49 m.

While this disclosure has been particularly shown and described with references to exemplary embodiments thereof, it will be understood by those skilled in the art that various changes in form and details may be made therein without departing from the scope of the claimed embodiments.

What is claimed is:

1. A method for navigation using cycle slip detection, the method comprising:

receiving, by a device, a broadband communication signal;

processing, by the device, the broadband communication signal based on a navigation framework to determine at least one carrier phase measurement;

compensating, by the device, for at least one error of the at least one carrier phase measurement using at least one detected cycle slip, wherein compensating for at least one error includes removing an effect of a receiver clock bias on the at least one carrier phase measurement relative to a reference transmitter within a plurality of transmitters by detecting the occurrence of cycle slips according to:

$$\phi_i^{(u)} = \frac{1}{\lambda^{(u)}} d_i^{(u)} + \frac{c}{\lambda^{(u)}} \left( \delta t_r - \delta t_s^{(u)} \right) + N_i^{(u)} + \varepsilon_{\phi_i}^{(u)}, \text{ [cycle]}$$

for $i = 1, \ldots, A$, $$\phi_{12}^{(u)}(n) \triangleq \phi_1^{(u)}(n) - \phi_2^{(u)}(n) = \underbrace{N_1^{(u)}(n) - N_2^{(u)}(n)}_{\triangleq N_{12}^{(u)}(n)} + \varepsilon_{\phi_{12}}^{(u)}(n),$$

$$\Delta \phi_{12}^{(u)}(n) \triangleq \phi_{12}^{(u)}(n) - \phi_{12}^{(u)}(0) = N_{12}^{(u)}(n) - N_{12}^{(u)}(0) + \varepsilon_{\phi_{12}}^{(ui)}(n)0 - \varepsilon_{\phi_{12}}^{(ui)}(0)$$

wherein A is a number of antenna ports of the LTE SDR, and wherein cycle slips occur when $\Delta\phi_{12}^{(u)}(n)$ exceeds a threshold;

determining, by the device, a position for the device based on the at least one carrier phase measurement and the at least one error; and outputting, by the device, a navigation observable based on the position determined for the device.

2. The method of claim 1, wherein the broadband communication signal is a cellular long term evolution (LTE) signal.

3. The method of claim 1, wherein the navigation framework includes an extended Kalman filter (EKF) state for navigation of an unmanned aerial vehicle (UAV).

4. The method of claim 1, wherein processing includes removing receiver clock bias from at least one of a carrier phase, code phase and frequency measurement data of the broadband communication signal.

5. The method of claim 1, wherein a last known location of the device is used to initialize the navigation framework.

6. The method of claim 1, wherein determining position includes determining position and velocity using a carrier phase measurements for a plurality of antennas of the device.

7. The method of claim 1, wherein the navigation observable includes at least one pseudorange measurement between the device and a source of the broadband communication signal, wherein output of a navigation filter includes two-dimensional position and velocity of the device.

8. The method of claim 1, wherein the navigation observable is a sub-meter-level accurate navigation determination.

9. The method of claim 1, further comprising controlling navigation of an unmanned aerial vehicle (UAV) by the device using LTE signals based on LTE code phase measurement.

10. A device configured for navigation using cycle slip detection, the device comprising:

a receiver module configured to receive a broadband communication signal; and a controller coupled to the receiver module, wherein the controller is configured to receive a broadband communication signal;

process the broadband communication signal based on a navigation framework to determine at least one carrier phase measurement;

compensate for at least one error of the at least one carrier phase measurement using detected cycle slips, wherein compensating for at least one error includes removing an effect of a receiver clock bias on the at least one carrier phase measurement relative to a reference transmitter within a plurality of transmitters by detecting the occurrence of cycle slips according to:

$$\phi_i^{(u)} = \frac{1}{\lambda^{(u)}} d_i^{(u)} + \frac{c}{\lambda^{(u)}} \left( \delta t_r - \delta t_s^{(u)} \right) + N_i^{(u)} + \varepsilon_{\phi_i}^{(u)}, \text{ [cycle]}$$

for $i = 1, \ldots, A$, $$\phi_{12}^{(u)}(n) \triangleq \phi_1^{(u)}(n) - \phi_2^{(u)}(n) = \underbrace{N_1^{(u)}(n) - N_2^{(u)}(n)}_{\triangleq N_{12}^{(u)}(n)} + \varepsilon_{\phi_{12}}^{(u)}(n),$$

$$\Delta \phi_{12}^{(u)}(n) \triangleq \phi_{12}^{(u)}(n) - \phi_{12}^{(u)}(0) = N_{12}^{(u)}(n) - N_{12}^{(u)}(0) + \varepsilon_{\phi_{12}}^{(ui)}(n)0 - \varepsilon_{\phi_{12}}^{(ui)}(0)$$

wherein A is a number of antenna ports of the LTE SDR, and wherein cycle slips occur when $\Delta\phi_{12}^{(u)}(n)$ exceeds a threshold;

determine a position for the device based on the at least one carrier phase measurement and the at least one error; and output a navigation observable based on the position determined for the device.

11. The device of claim 10, wherein broadband communication signal is a cellular long term evolution (LTE) signal.

12. The device of claim 10, wherein navigation framework includes an extended Kalman filter (EKF) state for navigation of an unmanned aerial vehicle (UAV).

13. The device of claim 10, wherein processing includes removing receiver clock bias from at least one of a carrier phase, code phase and frequency measurement data of the broadband communication signal.

14. The device of claim 10, wherein a last known location of the device is used to initialize the navigation framework.

15. The device of claim 10, wherein determining position includes determining position and velocity using a carrier phase measurements for a plurality of antennas of the device.

16. The device of claim 10, wherein the navigation observable includes at least one pseudorange measurement between the device and a source of the broadband communication signal, wherein output of a navigation filter includes two-dimensional position and velocity of the device.

17. The device of claim 10, wherein the navigation observable is a sub-meter-level accurate navigation determination.

18. The device of claim 10, further comprising controlling navigation of an unmanned aerial vehicle (UAV) by the device using LTE signals based on LTE code phase measurement.

* * * * *